US007481150B2

(12) United States Patent
Lofink, Jr.

(10) Patent No.: US 7,481,150 B2
(45) Date of Patent: Jan. 27, 2009

(54) FLUID CYLINDER FOR HIGH TEMPERATURE APPLICATIONS

(75) Inventor: Robert William Lofink, Jr., Pickens, SC (US)

(73) Assignee: Compact Automation Products, LLC, Westminster, SC (US)

( * ) Notice: Subject to any disclaimer, the term of this patent is extended or adjusted under 35 U.S.C. 154(b) by 171 days.

(21) Appl. No.: 11/511,888

(22) Filed: Aug. 29, 2006

(65) Prior Publication Data

US 2008/0053306 A1 Mar. 6, 2008

(51) Int. Cl.
*F16J 10/02* (2006.01)
*F16J 9/00* (2006.01)

(52) U.S. Cl. .......................... 92/169.1; 92/223; 92/246; 92/252

(58) Field of Classification Search .................. 92/172, 92/192, 130 B, 246, 223, 169.1, 251, 252
See application file for complete search history.

(56) References Cited

U.S. PATENT DOCUMENTS 1,932,779 A * 10/1933 Gray .......................... 277/446
2,880,109 A * 3/1959 Current et al. .............. 427/591
2,905,512 A * 9/1959 Anderson ................... 277/442
2,918,903 A * 12/1959 Geyer ............................ 92/33
3,337,938 A * 8/1967 Prasse ................... 29/888.074
4,516,481 A * 5/1985 Geffroy et al. ................ 92/240
4,621,026 A 11/1986 Robinson
4,809,991 A * 3/1989 Blatt .......................... 277/434
4,833,041 A 5/1989 McComas
4,928,577 A * 5/1990 Stoll ........................... 92/177
5,019,163 A 5/1991 McComas
5,341,723 A 8/1994 Hung
5,456,161 A 10/1995 Yuda et al.
5,960,693 A 10/1999 Yuda, Jr.
6,035,609 A 3/2000 Evans et al.
6,066,406 A 5/2000 McComas
6,116,139 A 9/2000 Yuda, Jr. et al.
6,116,399 A 9/2000 Drexl et al.
6,183,546 B1 2/2001 McComas
6,319,308 B1 11/2001 McComas
6,436,470 B1 * 8/2002 Iacocca et al. .............. 427/201
6,782,650 B2 8/2004 McComas
6,918,407 B2 7/2005 White et al.
2006/0024447 A1 2/2006 McComas
2006/0024514 A1 2/2006 McComas

* cited by examiner

*Primary Examiner*—Thomas E Lazo
(74) *Attorney, Agent, or Firm*—Dority & Manning, P.A.

(57) ABSTRACT

A fluid cylinder for high temperature applications is disclosed. The fluid cylinder includes an extensible member that moves between a retracted position and an extended position by forcing a fluid, such as a pneumatic fluid or a hydraulic fluid, into the cylinder. In order to seal the extensible member against an internal surface of the cylindrical housing, the extensible member includes a sealing member defining a plurality of grooves. A corresponding plurality of metallic sealing rings are placed in each of the grooves. The sealing rings include a gap that allow for thermal expansion. The sealing rings are positioned in the grooves so that the gaps on the rings are in a staggered arrangement in the axial direction. Further, a metal alloy coating may be applied to at least certain parts of the fluid cylinder. Through the above configuration, the fluid cylinder can be made without any polymeric sealing rings, composite bearings, or lubricants that may degrade during high temperature applications.

23 Claims, 4 Drawing Sheets

FLUID CYLINDER FOR HIGH TEMPERATURE APPLICATIONS

BACKGROUND OF THE INVENTION

Fluid cylinders, such as pneumatic cylinders and hydraulic cylinders, are used in many industrial processes due to their capability for producing great forces through their use of relatively simple and inexpensive constructions. Fluid cylinders typically operate by forcing a fluid into a chamber that causes an actuator to move, for instance, in a linear direction. The actuator may be moved, for instance, by applying air or liquid pressure to the actuator. In order for the device to work properly, the actuator generally needs to form a tight seal against the walls of the channel in which the actuator moves.

In the past, in order to form a seal between the actuator and the walls of the housing, various lubricants and sealing polymers, such as O rings, were used. Conventional sealing methods, however, are generally not designed to be used in high temperature applications. For example, many sealing polymers and composite bearing elements typically do not have operating ranges exceeding about 400° F. As such, a need currently exists for a fluid cylinder that may be used in high temperature applications. For example, a fluid cylinder is needed that is capable of withstanding a continuous operating temperature of greater than about 600° F.

SUMMARY

In general, the present disclosure is directed to a fluid cylinder that is particularly well configured for use in high temperature applications. For instance, the cylinder is capable of operating without degrading at temperatures greater than about 400° F., such as greater than about 600° F., such as greater than even about 800° F.

In one embodiment, the fluid cylinder includes a cylinder housing defining a bore that extends in an axial direction. An extensible member is positioned within the bore of the cylinder housing. The extensible member moves between a retracted position and an extended position. The extensible member includes a sealing member that defines a plurality of grooves.

In accordance with the present disclosure, a plurality of metallic sealing rings are each located within a corresponding groove in the sealing member. For instance, the fluid cylinder may include greater than about 2 sealing rings, such as from about 3 sealing rings to about 5 sealing rings. Each ring defines a gap along a circumference of the ring. The rings are positioned in the grooves so that the gaps on the rings are in a staggered arrangement in an axial direction. The gaps are present on the ring in order to allow the rings to thermally expand during high temperature applications. The gaps are placed in a staggered arrangement so that the rings, when assembled together, form a seal between the sealing member and the interior walls of the bore.

If desired, a metal alloy coating may also be present that covers at least an inside surface of the bore of the cylinder housing. For instance, the metal alloy coating can cover the inside surface of the bore, the sealing member, and each of the sealing rings. In still another embodiment, the entire cylinder housing may be coated with the metal alloy coating. The metal alloy coating is designed to withstand high temperature applications, such as greater than about 400° F. without thermally degrading. The metal alloy coating also reduces the coefficient of friction between the moving parts.

In one embodiment, the metal alloy coating contains a nickel alloy. Nickel may be present in the alloy coating, for instance, in an amount greater than about 80% by weight, such as from about 85% to about 97% by weight. In one particular embodiment, for instance, the metal alloy coating may comprise a nickel boron alloy coating. The nickel boron alloy coating may contain other metals if desired.

The fluid cylinder further includes at least one fluid passage for receiving a fluid. When the fluid is forced into the fluid passage, the fluid causes the extensible member to move to the extended position. In one embodiment, for instance, the fluid cylinder may be in communication with a fluid supply that supplies either pressurized air or a pressurized hydraulic fluid to the fluid cylinder.

In order to return the extensible member to the retracted position, either a fluid may be used or, alternatively, a biasing member may be present within the cylinder. The biasing member may comprise, for instance, a spring that biases the extensible member to the retracted position.

In one embodiment, the fluid cylinder is made that contains no polymeric sealing members, such as polymeric O rings and/or lubricants or other coatings. As described above, conventional sealing arrangements are typically not capable of withstanding higher temperatures. One advantage to the fluid cylinder of the present application is that the cylinder can be constructed without such conventional sealing elements.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1A:
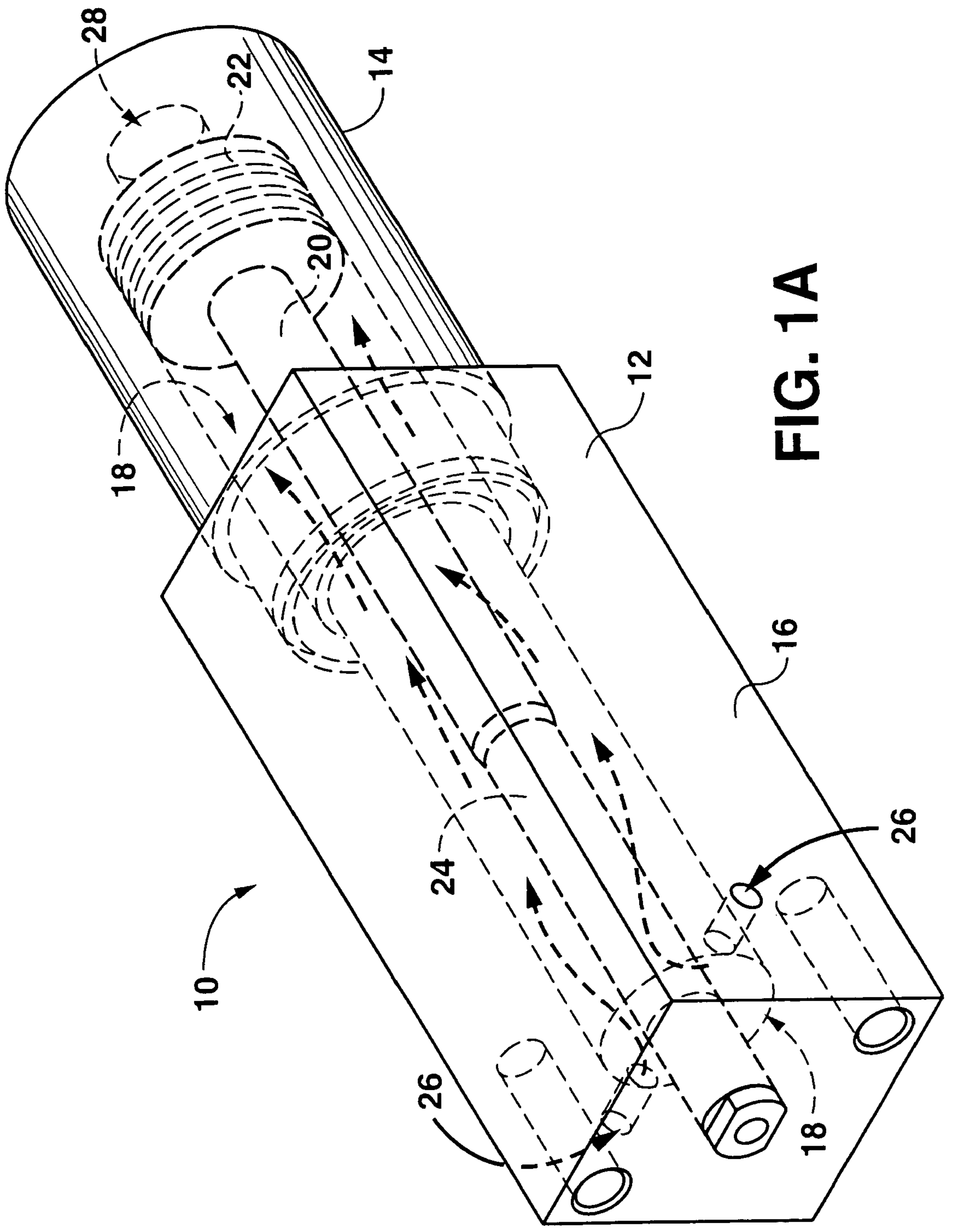
FIG. 1A is a perspective view of one embodiment of a fluid cylinder made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a fluid cylinder, such as a pneumatic cylinder or a hydraulic cylinder, that is particularly well suited for use in high temperature applications. In one embodiment, for instance, the fluid cylinder includes a cylinder housing defining a bore. An extensible member including a sealing member is contained in the bore and moves between an extended position and a retracted position through the use of a fluid force. In order to form a seal between the sealing member and the surface of the bore, the sealing member includes a labyrinth-type sealing arrangement. In particular, the sealing member defines a plurality of grooves. Metallic sealing rings are contained in each of the grooves. Each ring defines a gap along the circumference to allow the ring to thermally expand during high temperature applications. In order to form a tight seal, the rings are positioned in the grooves so that the gaps on the rings are in a staggered arrangement in the axial direction.

In an alternative embodiment, the inside surface of the bore of the cylinder housing and/or the sealing member is coated with a metal alloy coating that not only reduces the coefficient of friction between the two components but also is capable of withstanding high temperatures, such as those greater than about 400° F. without degrading. In one embodiment, for instance, the metal alloy coating contains primarily nickel, such as a nickel boron alloy coating.

In still another embodiment of the present disclosure, a fluid cylinder is constructed that not only includes the labyrinthine sealing arrangement as described above containing the metallic sealing rings, but also contains the metal alloy coating.

Figure 1B:
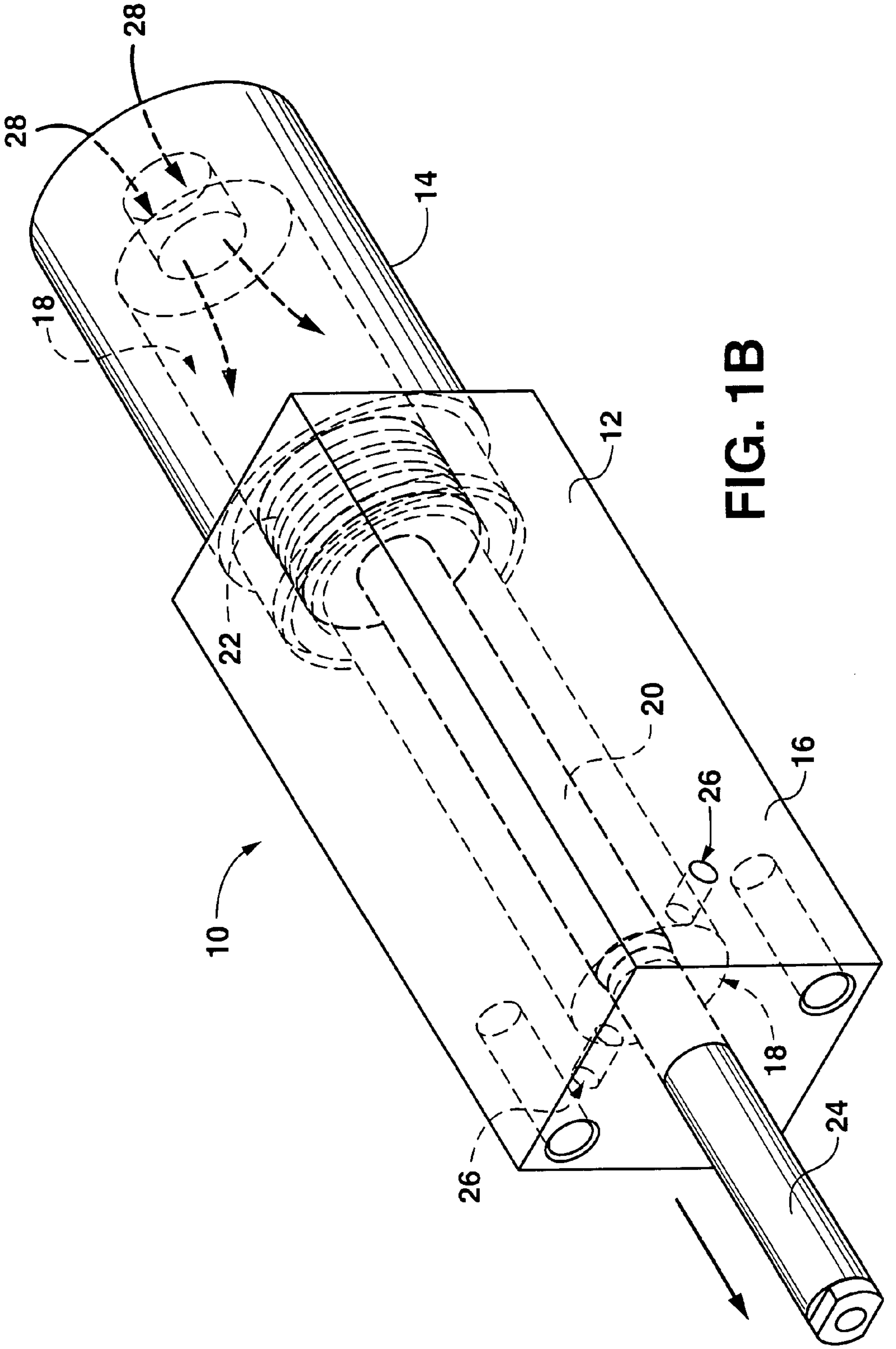
FIG. 1B is another perspective view of the embodiment illustrated in FIG. 1A.
Figure 2:
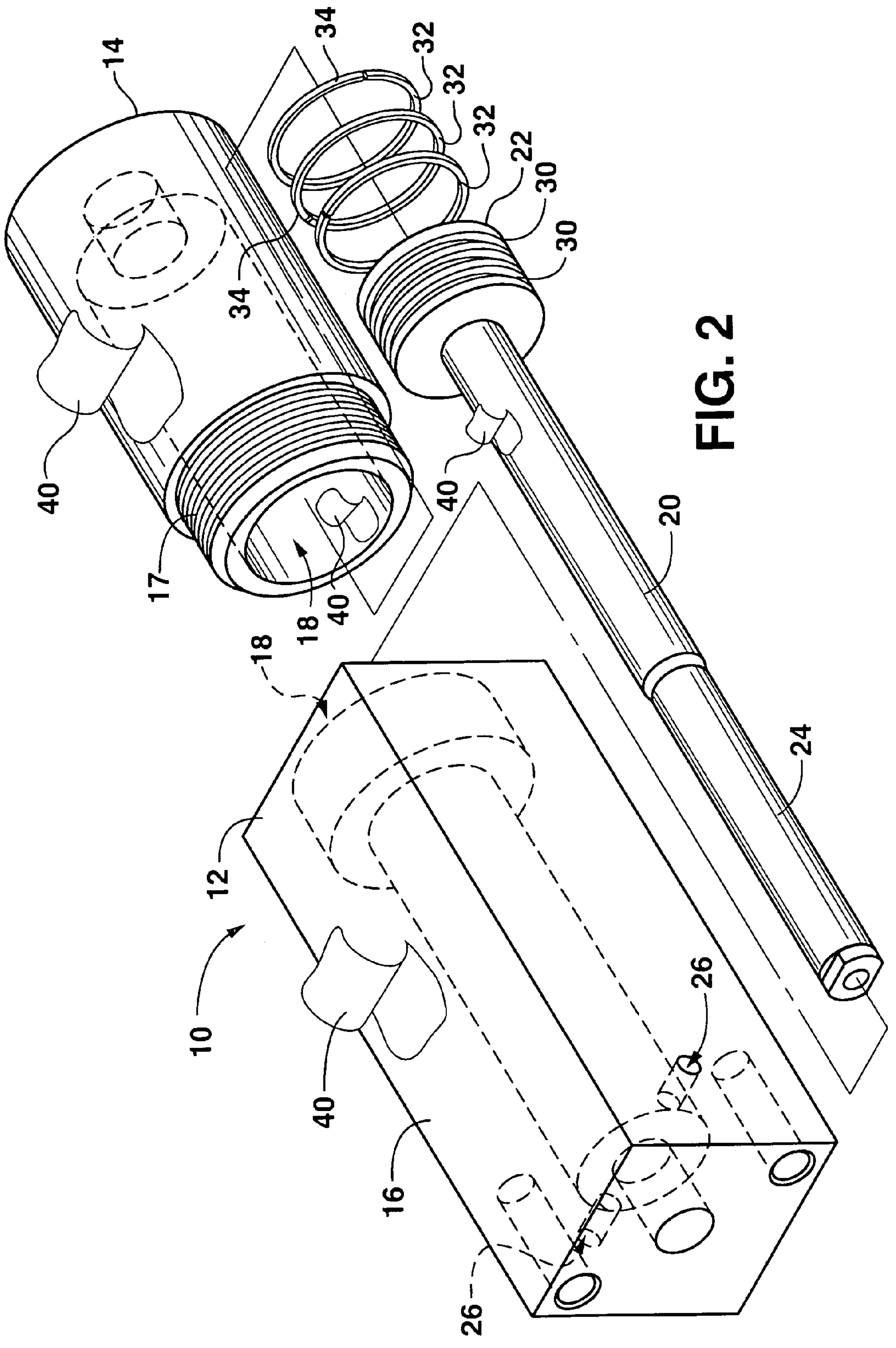
FIG. 2 is an exploded view of the fluid cylinder illustrated in FIG. 1A.

Referring to FIGS. 1A, 1B and 2, one embodiment of a fluid cylinder 10 made in accordance with the present disclosure is shown. The fluid cylinder 10 includes a cylinder housing 12 that, in this embodiment, is divided into a first section 14 and a second section 16. The first section 14 and the second section 16 of the cylinder housing 12 may be attached together using any suitable method. For example, in one embodiment, the first section 14 of the housing may include threads 17 that allow the first section 14 to screw together with the second section 16. It should be understood, however, that various other methods may be used in order to attach the first section to the second section. For example, in other embodiments, the two pieces may be welded together.

As shown particularly in FIG. 2, the cylinder housing 12 defines a bore 18 that extends in an axial direction. In this embodiment, the diameter of the bore varies over the length of the housing 12. More particularly, the diameter of the bore 18 is larger within the first section 14 of the cylinder housing 12 than in the second section 16 of the housing 12.

Positioned within the bore 18 of the cylinder housing 12 is an extensible member 20. The extensible member 20 includes a sealing member 22 attached to a shaft 24. As shown in FIGS. 1A and 1B, the sealing member 22 is contained within the bore 18 defined by the first section 14 of the cylinder housing 12. More particularly, the sealing member 22 has substantially about the same diameter as the diameter of the bore within the first section 14. The sealing member 22, however, is capable of moving within the bore between a retracted position and an extended position. FIG. 1A illustrates the retracted position, while FIG. 1B illustrates the extended position. As shown in FIG. 1B, in the extended position, the shaft 24 of the extensible member 20 projects outside of the cylinder housing 12.

In order to move the extensible member 20 between the retracted position and the extended position, a fluid is introduced into the cylinder housing that acts against the sealing member 22. For example, as shown in FIG. 1A, the fluid cylinder 10 includes a pair of opposing fluid passages 26. A fluid from a fluid supply is forced into the passages 26 and acts against the sealing member 22 for moving or maintaining the extensible member 20 in a retracted position. In the embodiment shown in FIG. 1A, two different fluid passages are shown. It should be understood, however, that more or less fluid passages may be present.

The fluid introduced into the fluid passages 26 may depend upon the particular application and various other factors. In general, a pneumatic fluid or a hydraulic fluid may be used. The pneumatic fluid, for instance, may comprise pressurized air.

As shown in FIG. 1B, in order to move the extensible member 20 into the extended position, the fluid cylinder 10 includes one or more further fluid passages 28. Fluid forced into the fluid passages 28 pushes against the sealing member 22 in order to move the extensible member 20 into an extended position.

Thus, the position of the extensible member 20 in the embodiment illustrated in FIGS. 1A, 1B, and 2 is controlled by fluid pressure acting against the sealing member 22. Fluid is forced against either side of the sealing member in order to extend and retract the shaft 24. By increasing fluid pressure, the fluid cylinder has the capability of producing great forces that can be used to move or act against other equipment during various industrial processes. In order for the fluid to properly move the extensible member 20, the sealing member 22 generally forms a seal with the inside surface of the bore 18. The sealing arrangement used in accordance with the present disclosure is particularly illustrated in FIG. 2.

As shown in FIG. 2, the sealing member 22 includes a plurality of grooves 30. A corresponding number of metallic sealing rings 32 are then positioned within each of the grooves 30. The sealing rings 32 form a tight, but movable fit between the sealing member 22 and the inside surface of the bore 18.

The sealing rings 32 can be made from any suitable metallic material. Each ring, as illustrated in FIG. 2, further includes a gap 34 located along the circumference of the ring. The gap 34 is present in the ring in order to allow the rings to thermally expand during high temperature applications. When placed on the sealing member 22, the gaps are arranged in a staggered configuration in the axial direction. In this manner, a labrythine path is created by the gaps which prevents the pneumatic or hydraulic fluid from passing from one side of the sealing member to the opposite side.

Of particular advantage, the metallic sealing rings 32 allow for a tight seal to be created between the inside surface of the bore 18 and the sealing member 22 without the use of conventional polymeric O rings or other conventional composite bearing elements. Such conventional materials are typically not capable of operating at higher temperatures.

In addition to the sealing rings 32, in one embodiment, all of the components of the fluid cylinder are also made from a metal. For instance, the sealing rings 32, the extensible member 20 and the cylinder housing 12 can all be made from a metal or other suitable hard material capable of withstanding high temperatures. In one embodiment, all of the components can be made from the same metal so that all of the components are made with a material having the same thermal expansion coefficient.

Metals that may be used in order to construct the fluid cylinder 10 include, for instance, stainless steel or aluminum. It should be understood, however, that various other metals and metal alloys may also be used.

In one embodiment, the fluid cylinder 10 may include a metal alloy coating that further serves to protect the different parts during high temperature operation and/or may be used to reduce the coefficient of friction between the moving parts. For example, in one embodiment, at least the inside surface of the bore 18 is coated with a metal alloy coating capable of withstanding higher temperatures. The metal alloy coating, for instance, may contain nickel in combination with other metals. Nickel may be present in the coating, for instance, in an amount greater than about 80% by weight, such as from about 85% to about 97% by weight. The coating may be applied to the inside surface of the bore and/or to the other parts using an electroless coating process or through electrochemical deposition. Various coatings, for instance, that may be used in accordance with the present disclosure are described in U.S. Pat. No. 4,833,041, U.S. Pat. No. 6,066,406, U.S. Pat. No. 6,183,546, U.S. Pat. No. 6,319,308, U.S. Pat.

No. 6,782,650, and U.S. Patent Application Publication No. US2006/0024514, which are all incorporated herein by reference.

For example, in one particular embodiment, a nickel boron alloy coating is formed on at least certain portions of the fluid cylinder by contacting the parts with an electroless deposition solution. The bath solution may contain, for instance, nickel ions, optionally cobalt ions, a chemical agent for adjusting the pH of the bath to between about 10 to about 14, a complexing agent, and a borohydride reducing agent. Optionally, a stabilizer, such as lead tungstate may also be present in the bath. For exemplary purposes only, for instance, the bath may contain nickel ions in an amount from about 0.175 to about 2.10 moles per gallon. Cobalt ions may be present in the bath in an amount up to about 1 mole per gallon. The complexing agent may be present in an amount from about 2 moles per gallon to about 7 moles per gallon, while the borohydride reducing agent may be present in an amount up to about 1 mole per gallon.

The borohydride reducing agent can be selected from any suitable borohydride, such as sodium borohydride. Substituted borohydrides may also be used, such as sodium trimethoxyborohydride.

The electroless coating solution can have a pH of greater than about 10, such as from about 12 to about 14. The pH can be controlled using any suitable alkaline salt, such as alkali metal hydroxides and ammonium hydroxide. Examples of metal hydroxides include sodium hydroxide and potassium hydroxide.

The complexing agent may be present in order to prevent precipitation of the metal ions. The complexing agent may comprise an ammonia or organic complex forming agent containing one or more of the following functional groups: primary amino, secondary amino, tertiary amino, imino, carboxy and hydroxy. Particular complexing agents include ethylenediamine, diethylene triamine, triethylene tetraamine, an organic acid, oxalic acid, citric acid, tartaric acid, and ethylene diamine tetraacetic acid and water soluble salts thereof.

The metal ions, such as nickel ions, can be present in the bath by adding any suitable soluble salt. Such salts include chlorides, sulfates, formates, acetates, and other similar salts.

The coating solution can be prepared by forming an aqueous solution of the appropriate amounts of metal salts, adding the complexing agent, and stabilizer and adjusting the pH to greater than about 12 while heating to a temperature of about 195° F. Prior to contacting the solution with the component from the fluid cylinder, the required amounts of sodium borohydride may be added. In one embodiment, the part may be immersed in the coating solution to initiate the coating process. The process is continued until deposition of the coating has progressed to the desired thickness or until the metal ions are depleted from the solution.

The ultimate coating thickness can depend upon various factors and the desired result. For instance, coating thicknesses can be from about 1 micron to well over 50 microns. For instance, in one embodiment, the coating thickness may be from about 10 microns to about 50 microns.

In one alternative embodiment, the stabilizer may comprise a thallium salt, such as a thallium sulfate, thallium nitrate, and mixtures thereof. In this embodiment, the thallium becomes co-deposited with the nickel boron alloy.

In still another embodiment, various particles can be added to the coating solution in order to improve various properties of the resulting coating. For example, particles such as diamonds, boron carbide, silica carbide and the like can be co-deposited in the nickel boron alloy coating. The particles can have a size of generally less than about 10 microns, such as less than about 1 micron. The amount of particles in the coating solution can range from about 0.05 to about 0.15 grams per gallon. In this embodiment, the coating can contain nickel in an amount from about 85% to about 97% by weight, can contain boron in an amount from about 1% to about 8% by weight, such as from about 2% to about 5% by weight, and can contain the particles in an amount up to about 37% by volume.

In still another embodiment, a lubricant can be introduced into the nickel boron coating by co-depositing a lubricant particle with the coating material or after treating the nickel boron coating with a dry lubricant. For instance, the lubricant can be blasted into the coating with high pressure or burnishing the dry lubricant into the nickel boron surface with a tumbling bowl or by rubbing the dry particles into the nickel boron surface. Examples of dry lubricants are tungsten disulfide or molly disulfide or a fluorocarbon, such as a polytetrafluoroethylene.

In yet another embodiment, nanometer particles may be introduced into the plating solution. The nanoparticles may comprise zirconium oxide, silicon carbide, and the like. The particles may have a size of less than about 50 nanometers.

Once coated on the parts of the fluid cylinder, the coating can also be heat treated in order to increase hardness. For instance, in one embodiment, the coating can be heated to temperatures greater than about 500° F., such as about 700° F. for about 90 minutes.

As described above, in one embodiment, the metal alloy coating can be applied to the interior surface of the bore 18 defined by the cylindrical housing 12. In addition to the bore 18, however, it should be understood that the coating can be applied to any and all of the component parts that make up the fluid cylinder 10. For example, as shown in FIG. 2, a metal alloy coating 40 is shown not only applied to the inside surface of the bore 18, but also to the outside surface of the cylinder housing 12, to the extensible member 20 including the sealing member 22 and can also be used to coat the sealing rings 32.

The metal alloy coating, in one embodiment, should be capable of withstanding relatively high temperatures, such as temperatures greater than about 400° F., without degrading. Once applied to the fluid cylinder 10, the coating 40 can provide various benefits and advantages. For example, the metal alloy coating 40 protects the different components from corrosion and can form a very hard surface on each of the parts. Also of advantage, the metal alloy coating reduces the coefficient of friction between the inside surface of the bore 18 and the sealing member 22. For instance, the metal alloy coating can produce a surface having a coefficient of friction of less than about 0.09, such as from about 0.07 to about 0.09.

In fact, when coated with the metal alloy coating, in one embodiment, no further lubricants may be needed within the fluid cylinder. For instance, no lubricants may be needed between the sealing member 22 and the inside surface of the bore 18.

Fluid cylinder 10 as shown in FIGS. 1A, 1B and 2 can be used in numerous applications. As described above, the fluid cylinder 10 is particularly well suited for use in high temperature applications. For example, in one embodiment, the fluid cylinder may be used to move a door or another mechanical part in a high temperature oven that is used to process various products, including textiles, polymer products, or food products. It should be understood, however, that the fluid cylinder may also be used in ambient and low temperature applications as well.

Figure 3:
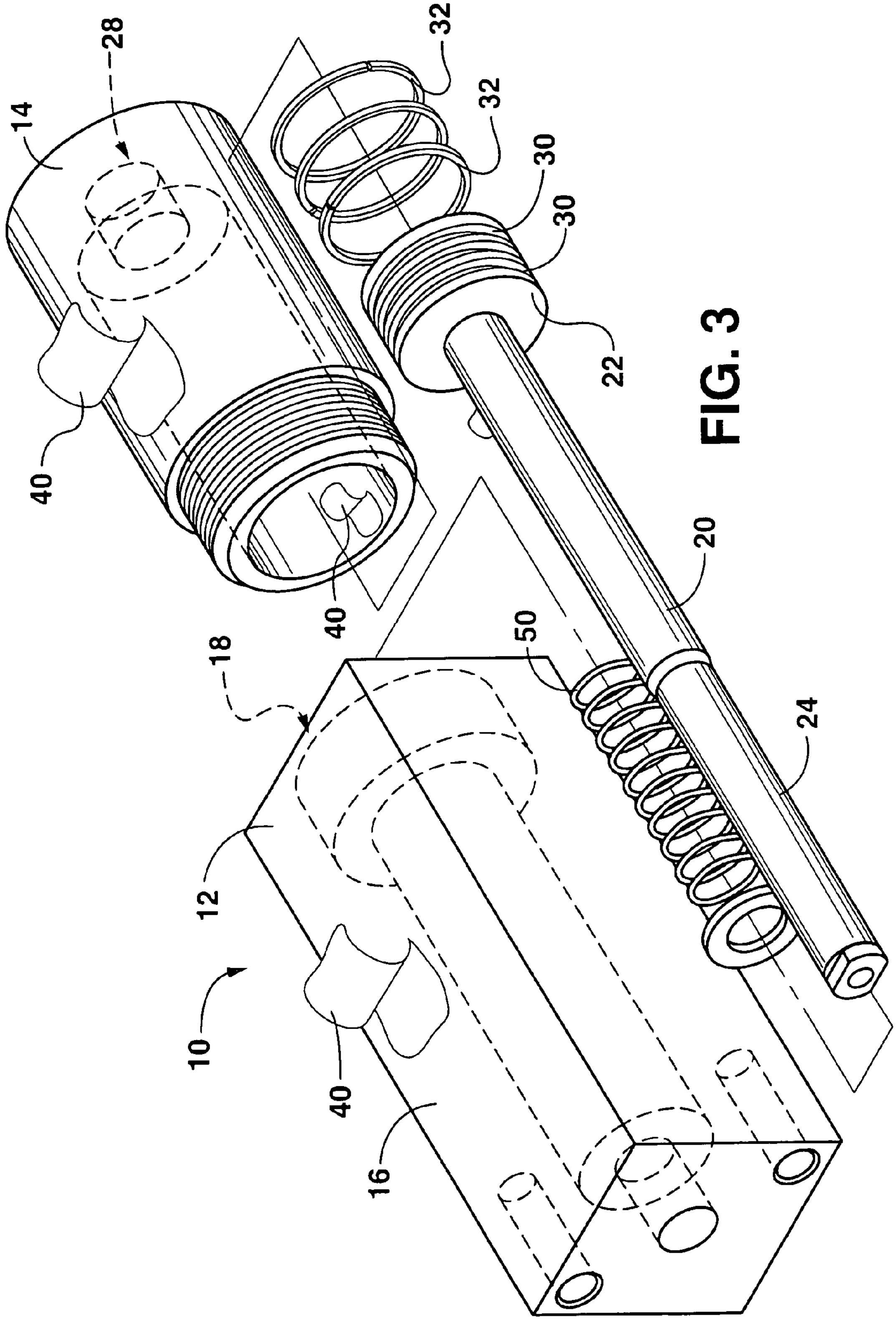
FIG. 3 is an exploded view of another alternative embodiment of a fluid cylinder made in accordance with the present disclosure.

Referring to FIG. 3, an alternative embodiment of a fluid cylinder made in accordance with the present disclosure is illustrated. Like reference numerals have been used to indicate similar elements.

As shown in FIG. 3, the fluid cylinder 10 includes a cylinder housing 12 comprising a first section 14 and a second section 16. The cylinder housing 12 defines a bore 18 that receives an extensible member 20. Extensible member 20 includes a shaft 24 connected to a sealing member 22. In accordance with the present disclosure, the sealing member 22 includes a plurality of grooves 30 for receiving a corresponding plurality of metallic sealing rings 32.

As also shown in FIG. 3, the fluid cylinder 10 can include a metal alloy coating 40. For instance, in one embodiment, the metal alloy coating comprises a nickel boron coating.

In order to move the extensible member 20 within the bore 18, the fluid cylinder 10 includes at least one fluid passage 26. Fluid passage 26 is placed in communication with a fluid supply that forces fluid into the fluid cylinder. Specifically, the fluid travels into the bore 18 defined by the cylinder housing 12 and acts against the sealing member 22 of the extensible member 20.

In the embodiment illustrated in FIG. 3, the fluid cylinder 10 only includes fluid passages designed to move the extensible member into an extended position. In addition, the fluid cylinder 10 includes a biasing member such as a spring 50 that biases the extensible member in a retracted position. Specifically, the spring 50 is designed to be placed over the shaft 24. When the extensible member 20 is placed in the bore 18, the spring places a force against the sealing member 22 biasing the sealing member into the retracted position. The fluid forced into the fluid passage 28 is then used to overcome the spring and move the sealing member into the extended position.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A fluid cylinder comprising:

a cylinder housing defining a bore that extends in an axial direction;

an extensible member that moves between a retracted position and an extended position within the bore of the cylinder housing, the extensible member including a sealing member that defines a plurality of grooves;

a plurality of metallic sealing rings, each ring being located within a corresponding groove in the sealing member, each ring defining a gap along a circumference of each ring, the rings being positioned in the grooves so that the gaps in the rings are in a staggered arrangement in the axial direction to form a liquid seal between the sealing member and the surface of the bore;

a metal alloy coating covering at least an inside surface of the bore, the metal alloy coating reducing the coefficient of friction of the inside surface; and at least one fluid passage for receiving a fluid and wherein, when fluid is forced into the fluid passage, the extensible member moves to the extended position.

2. A fluid cylinder as defined in claim 1, wherein the extensible member comprises a shaft attached to the sealing member, the shaft extending beyond the cylinder housing when the extensible member is in the extended position.

3. A fluid cylinder as defined in claim 1, wherein the extensible member and the sealing rings are all coated with the metal alloy coating.

4. A fluid cylinder as defined in claim 3, wherein the metal alloy coating has a thickness of from about 1 micron to about 50 microns.

5. A fluid cylinder as defined in claim 1, wherein the metal alloy coating comprises a nickel alloy coating.

6. A fluid cylinder as defined in claim 1, wherein the metal alloy coating comprises a nickel boron alloy coating.

7. A fluid cylinder as defined in claim 6, wherein the nickel boron alloy contains from about 85% to about 97% by weight nickel.

8. A fluid cylinder as defined in claim 1, wherein the cylinder includes from about 3 to about 5 sealing rings.

9. A fluid cylinder as defined in claim 1, wherein no further lubricants are present between the sealing member of the extensible member and the bore of the cylinder housing.

10. A fluid cylinder as defined in claim 1, wherein the metal alloy coating is capable of being exposed to temperatures greater than 500° F. without degrading.

11. A fluid cylinder as defined in claim 1, further comprising a biasing member that biases the extensible member towards the retracted position.

12. A fluid cylinder as defined in claim 1, further comprising a fluid supply for delivering fluid to the fluid passage, the fluid supply containing air.

13. A fluid cylinder as defined in claim 1, further comprising a fluid supply for delivering fluid to the fluid passage, the fluid supply containing a hydraulic fluid.

14. A fluid cylinder comprising:

a cylinder housing defining a bore that extends in an axial direction;

an extensible member that moves between a retracted position and an extended position within the bore of the cylinder housing, the extensible member including a sealing member that defines at least three grooves;

at least three metallic sealing rings, each ring being located within a corresponding groove on the sealing member, each ring defining a gap along a circumference of each ring, the rings being positioned in the grooves so that the gaps on the rings are in a staggered arrangement in the axial direction;

a metal alloy coating covering at least an inside surface of the bore, the sealing member, and the plurality of metallic sealing rings, the metal alloy coating comprising a nickel boron alloy; and at least one fluid passage for receiving a fluid and wherein when fluid is forced into the fluid passage, the extensible member moves to the extended position.

15. A fluid cylinder as defined in claim 14, wherein the extensible member comprises a shaft attached to the sealing member, the shaft extending beyond the cylinder housing when the extensible member is in the extended position.

16. A fluid cylinder as defined in claim 14, wherein no further lubricants are present between the sealing member of the extensible member and the bore of the cylinder housing.

17. A fluid cylinder as defined in claim 14, further comprising a biasing member that biases the extensible member towards the retracted position.

18. A fluid cylinder as defined in claim 14, further comprising a fluid supply for delivering fluid to the fluid passage, the fluid supply containing air.

19. A fluid cylinder as defined in claim 14, further comprising a fluid supply for delivering fluid to the fluid passage, the fluid supply containing a hydraulic fluid.

20. A fluid cylinder as defined in claim 14, wherein the nickel boron alloy contains from about 85% to about 97% by weight nickel.

21. A fluid cylinder as defined in claim 14, wherein the metal alloy coating has a thickness of from about 1 micron to about 50 microns.

22. A fluid cylinder as defined in claim 14, wherein the bore of the cylindrical housing includes a first section having a first diameter and a second section having a second diameter, the first diameter being greater than the second diameter, the sealing member being contained within the first section.

23. A fluid cylinder as defined in claim 14, wherein the fluid cylinder does not contain any polymeric sealing rings.

* * * * *